United States Patent
Heinzmann

[15] 3,642,354
[45] Feb. 15, 1972

[54] MOTION PICTURE CAMERA
[72] Inventor: Rolf Heinzmann, Schmiden, Germany
[73] Assignee: Robert Bosch Photokino GmbH, Stuttgart-Unterturkheim, Germany
[22] Filed: Aug. 19, 1969
[21] Appl. No.: 851,234

[30] Foreign Application Priority Data
Aug. 20, 1968 Germany .................. P 17 97 131.2

[52] U.S. Cl. .................................................... 352/91, 352/217
[51] Int. Cl. .................................................... G03b 21/36
[58] Field of Search ............ 352/91, 124, 141, 172, 173–179, 352/216–218

[56] References Cited

UNITED STATES PATENTS

| | | |
|---|---|---|
| 2,065,777 | 12/1936 | Weissbrodt .......................... 352/217 |
| 2,955,510 | 10/1960 | Heinz ................................... 352/124 |
| 3,186,319 | 6/1965 | Hochstein ........................... 352/178 X |
| 3,425,776 | 2/1969 | Mayr et al. .......................... 352/91 X |
| 3,512,881 | 5/1970 | Kubota ................................ 352/176 X |
| 3,246,944 | 4/1966 | Winkler ............................... 352/91 |

Primary Examiner—S. Clement Swisher
Assistant Examiner—Joseph W. Roskos
Attorney—Michael S. Striker

[57] ABSTRACT

A motion picture camera with dissolving shutter for fadeout and fade-in effects includes a mask which overlies a light-admitting opening in front of the film gate when the motor is operated in reverse following the fadeout. The mask prevents exposure of the film during rewinding preparatory to fade-in in the event that the operator fails to fully close the shutter during fadeout.

7 Claims, 2 Drawing Figures

PATENTED FEB 15 1972 3,642,354

INVENTOR
ROLF HEINZMANN

BY *Michael S. Stuhr*
HIS ATTORNEY

3,642,354

MOTION PICTURE CAMERA

BACKGROUND OF THE INVENTION

The present invention relates to improvements in motion picture cameras of the type having dissolving means for the production of fade-in and fadeout effects. More particularly, the invention relates to improvements in cameras which are equipped with manually operated or motor-driven dissolving means and wherein the mechanism which rewinds the film preparatory to fade-in preferably includes an electric motor or another prime mover.

In certain presently known motion picture cameras which are provided with a dissolving shutter, the operator is likely to arrest the motor which drives the film transporting mechanism during fadeout of a scene before the shutter is fully closed. Thus, the shutter can admit scene light to the motion picture film during rewinding which renders the film useless. The likelihood of incomplete closing of the shutter during fadeout is especially pronounced in motion picture cameras wherein the shutter is adjusted by hand and which embody a timer mechanism serving to automatically arrest the motor after a predetermined interval of time during which the film is being moved backwards preparatory to fade-in of the next-following scene. If an operator who is not fully familiar with the mode of operation of such motion picture cameras is slow in closing the shutter, the timer mechanism arrests the motor before the shutter is closed and, if the operator thereupon fails to completely close the shutter prior to fade-in, the corresponding portion of the film is exposed three times, namely, during fadeout, during rewinding and during fade-in so that is must be discarded. It can also happen that the adjusting mechanism for the dissolving shutter is inadvertently actuated upon completion of fadeout so that the shutter is partly open during rewinding of the film. Similar problems arise in connection with the manipulation of cameras which are equipped with motor-operated dissolving shutters. Though such cameras are less likely to admit scene light to motion picture film during rewinding, i.e., preparatory to fade-in, admission of light during rewinding is not impossible, especially if the camera is manipulated by an inexperienced amateur.

SUMMARY OF THE INVENTION

An object of my invention is to provide a motion picture camera of the type embodying dissolving means for the production of fadeout and fade-in effects with a novel and improved device which automatically prevents exposure of film to scene light during rewinding preparatory to fade-in of the next-following scene.

Another object of the invention is to provide a motion picture camera wherein the aforementioned device occupies little room and may perform one or more additional useful functions.

A further object of the invention is to provide a light intercepting device which can be incorporated in many presently known types of camera with minimal alterations in the design and mode of operation of such cameras.

An additional object of the invention is to provide a light intercepting device which need not be directly manipulated by the operator but is still effective to prevent the exposure of film to scene light during rewinding upon completion of fadeout even if the operator is not aware of the presence of such device in the camera.

The invention is embodied in a motion picture camera which comprises dissolving means operative to produce fadeout and fade-in effects, film transporting means arranged to move the film forwardly or backwards and preferably including a reversible electric motor, reversing means actuatable to set the film transporting means for operation in reverse during which the film is moved backwards preparatory to fade-in, and light intercepting means for preventing exposure of film to scene light during operation of the film transporting means in reverse and independently of the condition of the dissolving means following the completion of fadeout, i.e., independently of whether or not the dissolving means could admit scene light immediately after the fadeout of the preceding scene is completed.

In accordance with a presently preferred embodiment of my invention, the light intercepting means comprises a platelike mask which is biased to a retracted position and is movable by the reversing means to an intercepting position in which it overlies a film admitting opening in front of the film gate.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
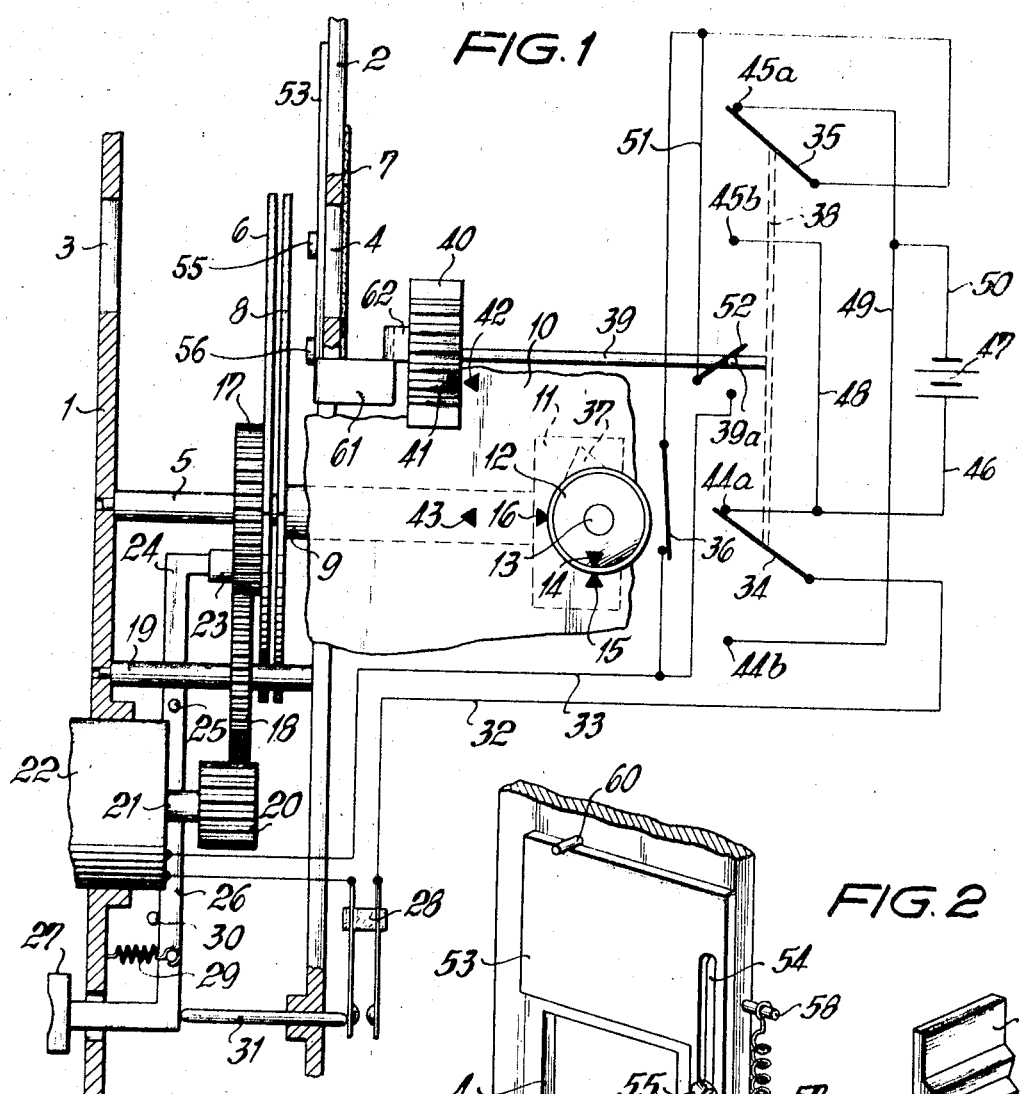
FIG. 1 is a fragmentary partly diagrammatic longitudinal vertical sectional view of a motion picture camera which embodies one form of the invention.

The motion picture camera of FIG. 1 comprises a housing or body including a front portion having two parallel panels or walls, 1, 2 which are respectively provided with registering light-admitting openings or windows 3, 4. A shaft 5 which is journaled in the walls 1, 2 forms part of a dissolving shutter which further includes a fixed blade or vane 6 and an adjustable blade or vane 8. The front blade 6 is provided with a customary cutout (not shown) which can admit scene light (entering by way of opening 3) to the opening 4 and thence to the motion picture film 7. The adjustable blade 8 is located behind the blade 6 and is secured to a hollow shaft 9 which is turnable on the shaft 5 by an adjusting mechanism installed in a box 11 which is fixed to a sidewall 10 of the camera body. The exact construction of the mechanism in the box 11 forms no part of this invention; it suffices to say that the mechanism includes a shaft 13 which is turnable by a knob 12 and serves to adjust a transmission which can change the angular position of the blade 8 with reference to the blade 6 so that the blade 8 overlies a smaller or a larger portion of the cutout in the blade 6 or completely overlaps such cutout in order to prevent any scene light from reaching the opening 4 and film 7. The knob 12 is accessible at the outer side of the camera body and is provided with an index 14 which can be moved into registry with and is movable between two markers 15, 16 applied to the outer side of the wall 10. When the index 14 registers with the marker 15, the dissolving shutter including the blades 6, 8 permits a maximum amount of scene light to reach the opening 9 once during each revolution of the shutter. The shutter does not admit any scene light when the knob 12 is turned in a clockwise direction to place the index 14 into registry with the marker 16. The effective size of the cutout in the front shutter blade 6 diminishes gradually when the knob 12 is rotated to move the index 14 from registry with the marker 15 into registry with the marker 16. Inversely, the amount of scene light reaching the opening 4 and film 7 increases gradually when the knob 12 is turned to move back toward the illustrated normal position.

The drive means for the shutter includes a gear train which derives motion from the film transporting unit. The latter includes a prime mover here shown as a reversible electric motor 22 which is mounted in the front wall 1 and whose output shaft 21 rotates the shaft 5 by way of the aforementioned gear train including a gear 17 on the shaft 5, an intermediate gear 18 which is fixed to an intermediate shaft 19 and meshes with the gear 17, and a pinion 20 which meshes with the intermediate gear 18 and is secured to the output shaft 21. The gear 17 is formed with a projection 23 which is normally engaged by the end portion 24 of a two-armed starter lever 26 fulcrumed at 25 and having a manually depressible pushbutton 27 which is accessible from without. When the pushbutton 27 is depressed, the end portion 24 of the lever 26 moves away from the projection 23 so that the gear 17 can rotate in response to completion of the motor circuit. This circuit includes a master switch 28 which is normally open but closes automatically in response to axial displacement of a push rod 31 which is reciprocably guided in the wall 2 of the camera body and abuts against the lower arm of the lever 26. The latter is biased to the illustrated idle position by a helical spring 29 which maintains its lower arm in abutment with a fixed stop 30. The left-hand contact of the master switch 28 is elastic and is strong enough to shift the push rod 31 to the illustrated position when the lever 26 abuts against the stop 30.

The circuit of the motor 22 further comprises two conductors 32, 33 which are respectively connected to movable contacts 34, 35. The master switch 28 is installed in the conductor 32; the conductor 33 contains a normally closed arresting switch 36 which can be opened by a lobe 37 of the knob 12 when the latter assumes that end position in which the index 14 registers with the fixed marker 16. The movable contacts 34, 35 are mechanically coupled to each other by a connecting member 38 having an arm 39 which can be moved up and down, as viewed in FIG. 1, by a motor-reversing knob 40. The knob 40 is mounted externally of the camera body and is movable between the illustrated upper end position in which its index 41 registers with a fixed marker 42 and a lower end position in which the index 41 registers with a second fixed marker 43 and the motor 22 is set to transport the film 7 backwards in response to depression of the pushbutton 27.

The movable contacts 34, 35 respectively cooperate with pairs of fixed contacts 44a, 44b and 45a, 45b. The contact 44a is connected to one pole of a battery 47 or an analogous energy source by a conductor 46 which latter is further connected with the contact 45b by a conductor 48. The contact 44b is connected with the contact 45a by a conductor 49 and the latter is connected with the other pole of the battery 47 by a conductor 50. A conductor 51 bridges the arresting switch 36 and contains a control switch 52 which is normally held in the illustrated open position by a pin 39a of the arm 39. The control switch 52 closes automatically when the reversing knob 40 is moved to its lower end position in which the index 41 registers with the fixed marker 43 on the wall 10.

The just described circuit includes two oppositely poled subcircuits for the motor 22. These subcircuits can be completed by the pushbutton 27 and reversing knob 40 at the will of the operator. In the illustrated upper end position of the reversing knob 40, the motor 22 is ready to transport the film 7 in a forward direction in response to depression of the pushbutton 27. The motor circuit is then completed from the one pole of the battery 47, by way of conductor 46, fixed contact 44a, movable contact 34, conductor 32, switch 28, the corresponding winding of the motor 22, conductor 33, arresting switch 36, movable contact 35, fixed contact 45a and conductors 49, 50 to the other pole of the battery 47. Upon completion of fadeout, and when the pushbutton 27 is depressed, the film 7 can be transported backwards in response to movement of the knob 40 to the lower end position; the motor circuit is then completed from the other pole of the battery 47, through the conductors 50, 49, fixed contact 44b, movable contact 34, conductor 32 and master switch 28, the corresponding winding of the motor 22, conductors 33, 51, control switch 52, movable contact 35, fixed contact 45b and conductors 48, 46 to the one pole of the battery. The film transporting mechanism preferably further comprises a customary claw pulldown (not shown) which advances the film in a forward direction when the knob 40 assumes the illustrated position and automatically transports the film in reverse when the knob 40 is moved to the other end position and while the motor circuit is completed in response to depression of the pushbutton 27. The claw pulldown can receive motion from the pinion 20 and/or output shaft 21.

Figure 2:
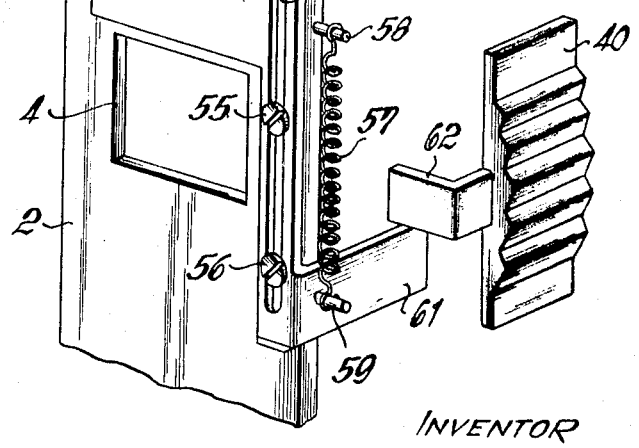
FIG. 2 is an enlarged perspective view of the reversing and light intercepting means in the camera of FIG. 1.

The reversing knob 40 is operatively connected with a light intercepting mask 53 which is located in front of the wall 2 and is movable from the illustrated retracted position (see particularly FIG. 2) to an extended or intercepting position in which it overlies the opening 4 and prevents scene light from reaching the film 7 irrespective of the effective size of the passage defined by the shutter blades 6 and 8. The mask 53 is movable in parallelism with the direction of film travel and is provided with an elongated guide slot 54 for the stems of two screws 55, 56 which are threaded into the wall 2. A biasing device here shown as a helical return spring 57 is attached to a post 58 on the wall 2 and to a post 59 on a follower 61 of the mask 53 so that it tends to move the mask toward and to maintain it in the illustrated retracted position. The knob 40 has an L-shaped extension 62 which engages the follower 61. When the knob 40 is released by the operator's finger, the spring 57 contracts and automatically moves the knob 40 and the mask 53 to the positions shown in FIG. 2. A fixed abutment 60 on the wall 2 defines the retracted position of the mask 53; in such position, the mask does not interfere with the passage of scene light through the opening 4.

The operation:

To start the motor 22, the user depresses the pushbutton 27 whereby the end portion 24 of the starter lever 26 moves away from the projection 23 of the gear 17 so that the gear train 17, 18, 20 is unblocked. At the same time, the lever 26 displaces the push rod 31 to close the master switch 28 whereby the motor circuit is completed from one pole of the battery 47, through the parts 46, 44a, 34, 32, 28, 22, 33, 36, 35, 45a, 49, 50 and to the other pole of the battery. The output shaft 21 rotates the shutter blades 6, 7 and simultaneously drives the aforementioned pulldown which advances the film 7 in a forward direction so that successive frames of the film are exposed to light which is admitted via opening 3, the cutout of the blade 6 and opening 4. The dissolving shutter admits a maximum amount of scene light because the index 14 of the knob 12 is in registry with the fixed marker 15. The reversing knob 40 dwells in the illustrated upper end position.

The motor 22 is arrested in response to termination of pressure against the pushbutton 27. The spring 29 then returns the starter lever 26 into abutment with the stop 30 and the master switch 28 opens automatically to open the motor circuit whereby its left-hand contact pushes the rod 31 back to the illustrated position.

If the operator wishes to produce a dissolve, i.e., to fade out the preceding scene and to fade in the next, the pushbutton 27 is depressed to start the motor 22 in the aforedescribed manner and the knob 12 is turned gradually to move the index 14 from registry with the marker 15 toward registry with the marker 16. The lobe 37 automatically opens the arresting switch 36 so that the motor 22 comes to a halt despite the fact that the operator presses the pushbutton 27. During the aforedescribed turning of the knob 12 in a clockwise direction, the mechanism in the box 11 adjusts the shutter by turning the rear blade 8 with reference to the front blade 6 so that the shutter admits less light during successive revolutions and ceases to admit scene light when the arresting switch 36 opens.

In the next step, the operator depresses the pushbutton 27 to close the master switch 28 and thereupon moves the knob 40 to its lower end position in which the index 41 registers with the marker 43. The control switch 52 is then closed so that the motor circuit is completed despite the fact that the lobe 37 of the knob 12 continues to maintain the arresting switch 36 in open position. The knob 40 also causes the parts 39, 38 to respectively move the contacts 34, 35 into engagement with fixed contacts 44b, 45b so that the motor circuit is completed from the other pole of the battery 47, through parts 50, 49, 44b, 34, 32, 28, 22, 33, 51, 52, 35, 45b, 48, 46 and to the one pole of the battery. The film 7 is transported backwards while the mask 53 overlies the opening 4 in the wall 2 because the extension 62 of the knob 40 moves the follower 61 and the mask 53 downwardly (away from the abutment 60) when the knob 40 moves its index 41 from registry with the marker 42 into registry with the marker 43. This insures that the film 7 cannot be exposed to scene light during rewinding even if, due to an oversight, the index 14 of the knob 12 does not register with the marker 16 when the motor 22 is operated in reverse, i.e., when the blades 6, 8 define a cutout whose effective size is not zero so that in the absence of the mask 53 scene light could reach the film during rewinding and would render the corresponding frames of the film useless.

The length of that portion of the film 7 which is to be rewound prior to fade-in is preferably determined automatically by a suitable timer mechanism which is not shown in the drawing. Reference may be had to the copending application, Ser. No. 728,996 filed May 14, 1968 by Herbert Reinsch and assigned to the same assignee. The timer mechanism automatically arrests the motor 22 upon completed rewinding of that length of film which was exposed during fadeout. The operator then releases the pushbutton 27 and the reversing knob 40 whereby the spring 57 contracts and returns the index 41 into registry with the marker 42 while the mask 53 reassumes the retracted position of FIG. 2. The control switch 52 opens and the movable contacts 34, 35 respectively engage the fixed contacts 44a, 45a.

To begin the fade-in, the operator depresses the pushbutton 27 to prepare the motor 22 for operation in a forward direction. The motor circuit is not completed because the lobe 37 still maintains the arresting switch 36 in open position. The operator then turns the knob 12 (while holding the pushbutton 27 in depressed position) so that the index 14 travels from registry with the marker 16 toward registry with the marker 15. The arresting switch 36 closes immediately or shortly after the index 14 leaves the marker 16 and the motor 22 is started to drive the film 7 in a forward direction. The knob 12 is preferably rotated at the same speed as during movement of the index 14 toward registry with the marker 16. The shutter admits more scene light during successive revolutions of its blades and is fully open when the index 14 returns into registry with the marker 15. From then on, the camera operates in a normal way and the shutter admits maximum amounts of scene light because the rear blade 8 does not interfere with the passage of scene light through the cutout of the front blade 6.

It is clear that the improved motion picture camera is susceptible of many modifications without departing from the spirit of my invention. For example, the mechanical connection between the reversing knob 40 and the mask 53 can be replaced by a different connection, such as an electromagnet or the like. Furthermore, the mask 53 can be omitted altogether if the camera is provided with an adjustable diaphragm which can close in response to movement of the knob 40 to the lower end position. Still further, the knob 40 can be operatively connected with the mechanism in the box 11 to automatically close the dissolving shutter in response to movement of the index 41 into registry with the marker 43. This insures that, if the knob 12 happens to dwell in an intermediate position when the operator decides to actuate the reversing knob 40, the latter automatically closes the dissolving shutter before the motor 22 is started in reverse. Such camera may include a motion transmitting member which is provided on or moves with the knob 40 and turns the knob 12 in a counterclockwise direction until the index 14 registers with the marker 16 before the motor 22 is started in reverse, provided that the knob 40 is actuated at a time when the knob 12 dwells in an intermediate position.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

1. In a motion picture camera, a combination comprising dissolving means including a shutter and operative to produce fadeout and fade-in effects; film transporting means arranged to move the film forwardly and backwards; reversing means actuatable to set the film transporting means for operation in reverse during which the film is moved backwards preparatory to fade-in; intercepting means for preventing exposure of film to scene light during operation of said film transporting means in reverse independently of the condition of said dissolving means following the completion of fadeout; an operative connection between said reversing means and said intercepting means, and a member defining a light-admitting opening, said intercepting means comprising a mask which is movable into registry with said opening in response to actuation of said reversing means, said mask being out of registry with said opening during forward transport of the film.

2. A combination as defined in claim 1, wherein said shutter is adjustable.

3. A combination as defined in claim 2, wherein said shutter is rotatable about a predetermined axis and further comprising drive means for rotating said shutter in response to operation of said film transporting means.

4. A combination as defined in claim 2, wherein said dissolving means further comprises manually operated adjusting means for said shutter.

5. In a motion picture camera, a combination comprising dissolving means operative to produce fadeout and fade-in effects; film transporting means arranged to move the film forwardly and backwards; reversing means actuatable to set the film transporting means for operation in reverse during which the film is moved backwards preparatory to fade-in; a member defining a light-admitting opening; intercepting means for preventing exposure of film to scene light during operation of said film transporting means in reverse independently of the condition of said dissolving means following the completion of fadeout, said intercepting means comprising a mask movable into and out of registry with said opening and biasing means for urging said mask to a position out of registry with said opening; and means for moving said mask into registry with said opening against the opposition of said biasing means.

6. In a motion picture camera, a combination comprising dissolving means operative to produce fadeout and fade-in effects; film transporting means arranged to move the film forwardly and backwards; reversing means actuatable to set the film transporting means for operation in reverse during which the film is moved backwards preparatory to fade-in; a member defining a light-admitting opening; intercepting means for preventing exposure of film to scene light during operation of said film transporting means in reverse independently of the condition of said dissolving means following the completion of fadeout, said intercepting means comprising a mask movable into and out of registry with said opening and biasing means for urging said mask to a position out of registry with said opening; and an operative connection between said reversing means and said intercepting means, said operative connection comprising means for moving said mask into registry with said opening against the opposition of said biasing means in response to actuation of said reversing means.

7. In a motion picture camera, a combination comprising dissolving means operative to produce fadeout and fade-in effects; film transporting means arranged to move the film forwardly and backwards; reversing means actuatable to set the film transporting means for operation in reverse during which the film is moved backwards preparatory to fade-in; and intercepting means for preventing exposure of film to scene light during operation of said film transporting means in reverse independently of the condition of said dissolving means following the completion of fadeout, said intercepting means comprising a mask movable between retracted and intercepting positions and means for moving said mask to said retracted position in response to completed operation of said film transporting means in reverse.

* * * * *